United States Patent
Adachi

(10) Patent No.: US 9,889,804 B2
(45) Date of Patent: Feb. 13, 2018

(54) VEHICULAR RESIN PANEL STRUCTURE

(71) Applicant: TOYOTA JIDOSHA KABUSHIKI KAISHA, Toyota-shi (JP)

(72) Inventor: Yoshiyuki Adachi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/922,576

(22) Filed: Oct. 26, 2015

(65) Prior Publication Data

US 2016/0137143 A1    May 19, 2016

(30) Foreign Application Priority Data

Nov. 13, 2014    (JP) .................................. 2014-230530

(51) Int. Cl.
| | |
|---|---|
| *B60R 13/08* | (2006.01) |
| *B62D 29/04* | (2006.01) |
| *B62D 27/02* | (2006.01) |
| *B62D 29/00* | (2006.01) |

(52) U.S. Cl.
CPC ............ *B60R 13/08* (2013.01); *B62D 27/026* (2013.01); *B62D 29/005* (2013.01); *B62D 29/043* (2013.01)

(58) Field of Classification Search
CPC .... B60R 13/08; B62D 27/026; B62D 29/005; B62D 29/043
See application file for complete search history.

(56) References Cited

FOREIGN PATENT DOCUMENTS

| | | | |
|---|---|---|---|
| JP | 3034380 U | | 2/1997 |
| JP | 2001-239841 A | | 9/2001 |
| JP | 2006-298329 | | 11/2006 |
| JP | 2009147488 A | * | 7/2009 |
| JP | 2011-136606 A | | 7/2011 |
| JP | 2013-79009 A | | 5/2013 |
| JP | 2013-129265 A | | 7/2013 |
| JP | 2015009449 A | * | 1/2015 |

* cited by examiner

*Primary Examiner* — D Glenn Dayoan
*Assistant Examiner* — Melissa A Black
(74) *Attorney, Agent, or Firm* — Oblon, McClelland, Maier & Neustadt, L.L.P.

(57) ABSTRACT

A vehicular resin panel structure including: an outer panel that includes an outer panel main body and an outer edge portion formed by bending an edge portion of the outer panel main body toward one side in a plate thickness direction of the outer panel main body; and a resin inner panel that includes an inner panel main body that is joined to the outer panel main body by an adhesive, and an inner edge portion that is formed by bending an edge portion of the inner panel main body toward another side in the plate thickness direction. A leading end portion of the inner edge portion abuts the outer panel main body, and a parting line during molding is formed at a location separated from the leading end portion.

6 Claims, 4 Drawing Sheets

VEHICULAR RESIN PANEL STRUCTURE

CROSS-REFERENCE TO RELATED APPLICATION

This application claims priority under 35 USC 119 from Japanese Patent Application No. 2014-230530 filed Nov. 13, 2014, the disclosure of which is incorporated by reference herein.

BACKGROUND

Technical Field

The technology disclosed herein relates to a vehicular resin panel structure.

Related Art

Conventional back door structures are known in which an inner panel and an outer panel are joined together in a state in which a fold portion folded toward the outer panel side is formed to an edge portion of the inner panel configuring a back door, and a leading end portion of the fold portion abuts an inner face of the outer panel (see, for example, Japanese Patent Application Laid-Open (JP-A) No. 2006-298329).

However, when the inner panel is molded using a resin material and a parting line is formed at the leading end portion of the fold portion during molding, burr is liable to occur at the parting line, such that burr is sometimes present at the leading end portion. There is a concern of noise occurring due to the burr scraping against the inner face of the outer panel when burr is present at the leading end portion.

SUMMARY

An object of an exemplary embodiment of the present invention is to obtain a vehicular resin panel structure capable of suppressing noise from occurring, even when a resin inner panel and an outer panel are joined together in a state in which an end portion of the inner panel abuts the outer panel.

A vehicular resin panel structure according to a first aspect of the present invention includes: an outer panel that includes an outer panel main body and an outer edge portion formed by bending an edge portion of the outer panel main body toward one side in a plate thickness direction of the outer panel main body; and a resin inner panel that includes an inner panel main body that is joined to the outer panel main body by an adhesive, and an inner edge portion that is formed by bending an edge portion of the inner panel main body toward another side in the plate thickness direction, a leading end portion of the inner edge portion abutting the outer panel main body, and a parting line during molding being formed at a location separated from the leading end portion.

In the vehicular resin panel structure according to the first aspect of the present invention, the parting line is formed to the inner edge portion of the resin inner panel at a position separated from the leading end portion abutting the outer panel main body during molding. Namely, even when burr occurs at the inner edge portion of the inner panel, the burr occurs at a position that is separated from the leading end portion that abuts the outer panel main body, such that the burr does not scrape against the outer panel main body. Thus noise is suppressed from occurring, even when the inner panel and the outer panel are joined in a state in which the leading end portion of the inner edge portion abuts the outer panel main body.

A vehicular resin panel structure according to a second aspect of the present invention is the vehicular resin panel structure according to the first aspect of the present invention, wherein a face of the outer edge portion that faces the inner edge portion includes an outer sloped face, and a face of the inner edge portion that faces the outer sloped face includes an inner sloped face with a plate thickness that decreases on progression toward the leading end portion.

In the vehicular resin panel structure according to the second aspect of the present invention, the inner sloped face with a plate thickness that decreases on progression toward the leading end portion is formed to the inner edge portion of the resin inner panel. A contact surface area of the leading end portion of the inner edge portion that abuts the outer panel main body is thereby reduced. The accuracy of a joint location between the inner panel and the outer panel is thereby improved.

A vehicular resin panel structure according to a third aspect of the present invention is the vehicular resin panel structure according to the second aspect of the present invention, wherein the outer sloped face and the inner sloped face are disposed parallel to each other.

In the vehicular resin panel structure according to the third aspect of the present invention, the outer sloped face and the inner sloped face are disposed parallel to each other. A space, that is formed between the outer sloped face and the inner sloped face and that absorbs variations in positioning accuracy when joining the inner panel and the outer panel together, is thereby more suitably secured than in a configuration in which the outer sloped face and the inner sloped face are not disposed parallel to each other.

A vehicular resin panel structure according to a fourth aspect of the present invention is the vehicular resin panel structure according to any one of the first aspect to the third aspect of the present invention, wherein the leading end portion is formed with a circular arc shaped cross-section.

In the vehicular resin panel structure according to the fourth aspect of the present invention, the leading end portion of the inner edge portion is formed with a circular arc shaped cross-section. The contact surface area of the leading end portion of the inner edge portion that abuts the outer panel main body is thereby further reduced compared to a configuration in which a circular arc shaped cross-section is not formed to the leading end portion. The accuracy of the joint position between the inner panel and the outer panel is thereby further improved.

A vehicular resin panel structure according to a fifth aspect of the present invention is the vehicular resin panel structure according to any one of the first aspect to the fourth aspect of the present invention, wherein the outer panel is made of resin.

In the vehicular resin panel structure according to the fifth aspect of the present invention, the outer panel is made of resin. The weight of the vehicular resin panel structure is thereby further reduced compared to a configuration in which the outer panel is not made of resin.

The vehicular resin panel structure according to the first aspect of the present invention enables generation of noise to be suppressed, even when the resin inner panel and the outer panel are joined together in a state in which the end portion of the inner panel abuts the outer panel.

The vehicular resin panel structure according to the second aspect of the present invention enables the accuracy of the joint position between the inner panel and the outer panel to be improved.

The vehicular resin panel structure according to the third aspect of the present invention enables the gap that absorbs variations in positioning accuracy when joining the inner panel and the outer panel together to be suitably secured.

The vehicular resin panel structure according to the fourth aspect of the present invention enables the accuracy of the joint position between the inner panel and the outer panel to be further improved.

The vehicular resin panel structure according to the fifth aspect of the present invention enables a further reduction in the weight of the vehicular resin panel structure to be achieved.

BRIEF DESCRIPTION OF THE DRAWINGS

Exemplary embodiments of the present invention will be described in detail based on the following figures, wherein.

DETAILED DESCRIPTION

Detailed explanation follows regarding an exemplary embodiment according to technology disclosed herein, based on the drawings. Note that for ease of explanation, in each of the drawings, the arrow UP indicates the vehicle body upper direction, the arrow FR indicates the vehicle body front direction, and the arrow LH indicates the vehicle body left direction, as appropriate. In the below explanation, unless specifically stated otherwise, reference to the up-down, front-rear, and left-right directions refers to up-down in the vehicle body up-down direction, front-rear in the vehicle body front-rear direction, and left-right in the vehicle body left-right direction (vehicle width direction).

Figure 1:
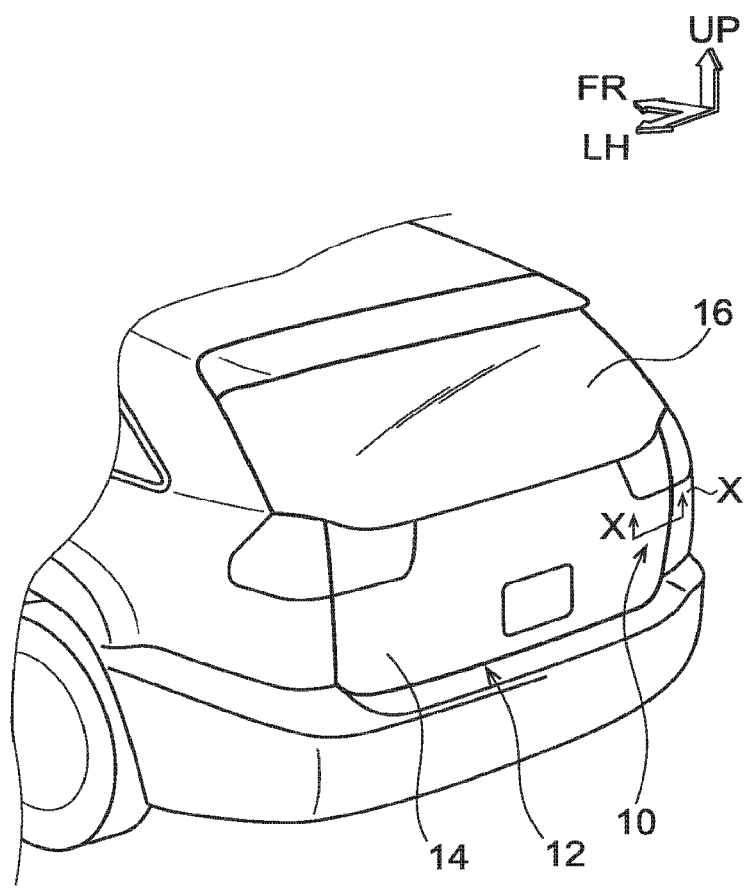
FIG. 1 is a perspective view illustrating a resin back door applied with a vehicular resin panel structure according to the technology disclosed herein.
Figure 2:
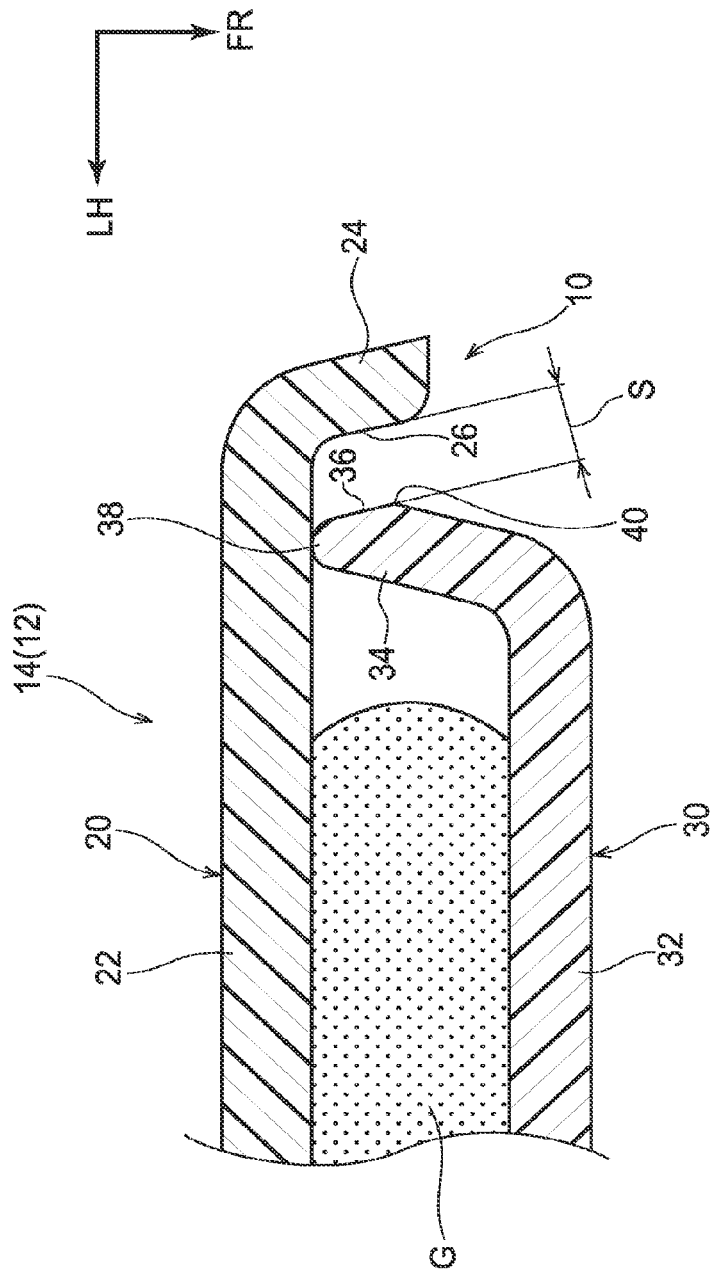
FIG. 2 is a cross-section view taken along the arrow line X-X in FIG. 1.

As illustrated in FIG. 1, a resin back door 12 applied with a vehicular resin panel structure 10 is configured including a back door panel 14 formed with a substantially rectangular shaped open section at an upper section side, and a back window glass 16 provided so as to close off the open section. As illustrated in FIG. 2, the back door panel 14 is configured by joining together a resin outer panel 20 and a resin inner panel 30 that has a smaller outer profile dimension than the outer panel 20.

The outer panel 20 and the inner panel 30 are each molded from a carbon fiber reinforced plastic (CFRP) material, for example, and are joined together using an adhesive G, described later. To explain in detail, the outer panel 20 includes an outer panel main body 22 formed in a substantially flat plate shape excluding a frame shaped section configuring the open section, and an outer edge portion 24 formed bent or curved toward the vehicle body front side (bent toward one side in the plate thickness direction of the outer panel main body 22) at at least both left and right side edge portions and a lower edge portion of the outer panel main body 22.

The inner panel 30 includes an inner panel main body 32 formed in a substantially flat plate shape excluding a frame section configuring the open section, and an inner edge portion 34 formed bent or curved toward the vehicle body rear side (bent toward the other side in the plate thickness direction of the outer panel main body 22) at at least both left and right side edge portions and a lower edge portion of the inner panel main body 32.

The outer panel main body 22 is joined to the inner panel main body 32 by the adhesive G in a state in which a leading end portion 38 of the inner edge portion 34 abuts an inner face of the outer panel main body 22. A closed cross-section profile is thereby configured by the outer panel main body 22 and the inner panel main body 32. The leading end portion 38 of the inner edge portion 34 that abuts the inner face of the outer panel main body 22 is formed with a circular arc shaped cross-section.

An inner face of the outer edge portion 24 that faces the inner edge portion 34 configures an outer sloped face 26, and an outer face of the inner edge portion 34 that faces the outer sloped face 26 configures an inner sloped face 36 that decreases in plate thickness on progression toward the leading end portion 38. The outer sloped face 26 and the inner sloped face 36 are disposed parallel to each other, and a specific space S (such as S=2 mm) is formed between the outer sloped face 26 and the inner sloped face 36.

The outer panel 20 and the inner panel 30 are molded, for example, by a sheet molding compound (SMC) press-molding method. The SMC press-molding method is a molding method in which burr is relatively liable to occur; however, the inner panel 30 according to the present exemplary embodiment may even be manufactured using a molding method in which burr is liable to occur. Explanation follows regarding a manufacturing method of the inner panel 30.

Figure 3A:
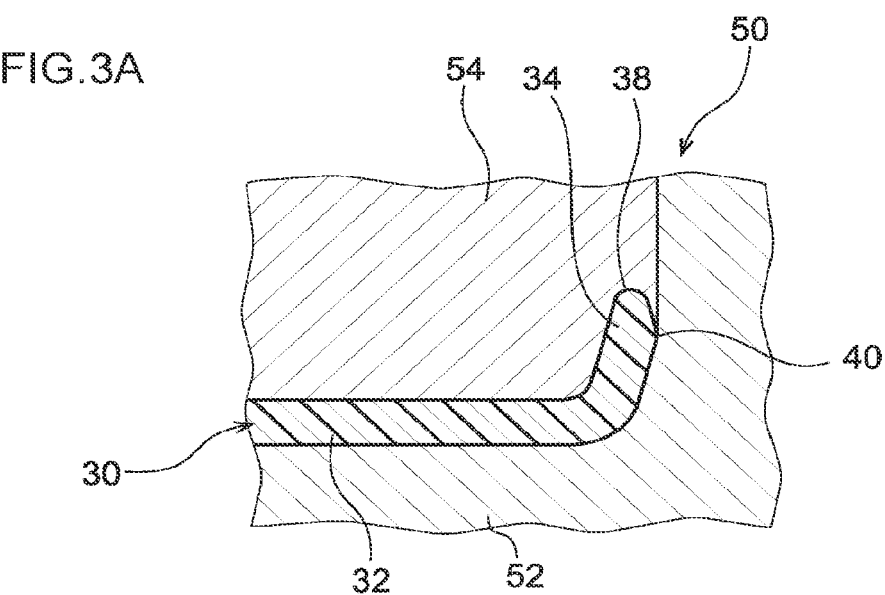
FIG. 3A is a cross-section view illustrating a manufacturing method of an inner panel configuring a vehicular resin panel structure according to technology disclosed herein.

As illustrated in FIG. 3A, a thermoset resin material, this being a CFRP material in this example, in sheet form is set inside a mold 50, and heat and pressure are applied using a hydraulic press (not illustrated in the drawings). The inner panel 30 is manufactured accordingly; however, a boundary portion of the inner edge portion 34 between a fixed mold 52 and a movable mold 54 configures a location separated from the leading end portion 38. Specifically, a parting line 40 indicating the boundary portion is formed at a short direction partway portion that configures an outermost side portion of the outer face of the inner edge portion 34.

Figure 3B:
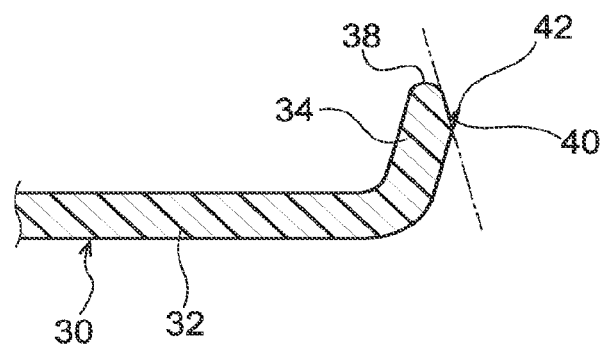
FIG. 3B is a cross-section view illustrating a manufacturing method of an inner panel configuring a vehicular resin panel structure according to technology disclosed herein.
Figure 3C:
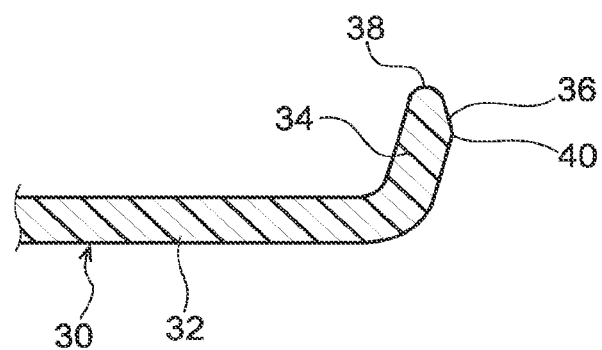
FIG. 3C is a cross-section view illustrating a manufacturing method of an inner panel configuring a vehicular resin panel structure according to technology disclosed herein.

Thus, as illustrated in FIG. 3B, burr 42 sometimes occurs at the parting line 40 at the outer face of the inner edge portion 34. The outer face of the inner edge portion 34, including the burr 42, is therefore cut into a planar shape in a subsequent process. As illustrated in FIG. 3C, the inner sloped face 36 with decreasing plate thickness on progression toward the leading end portion 38 is thereby formed to the outer face of the inner edge portion 34.

Explanation follows regarding operation of the vehicular resin panel structure 10 configured as described above.

Figure 4:
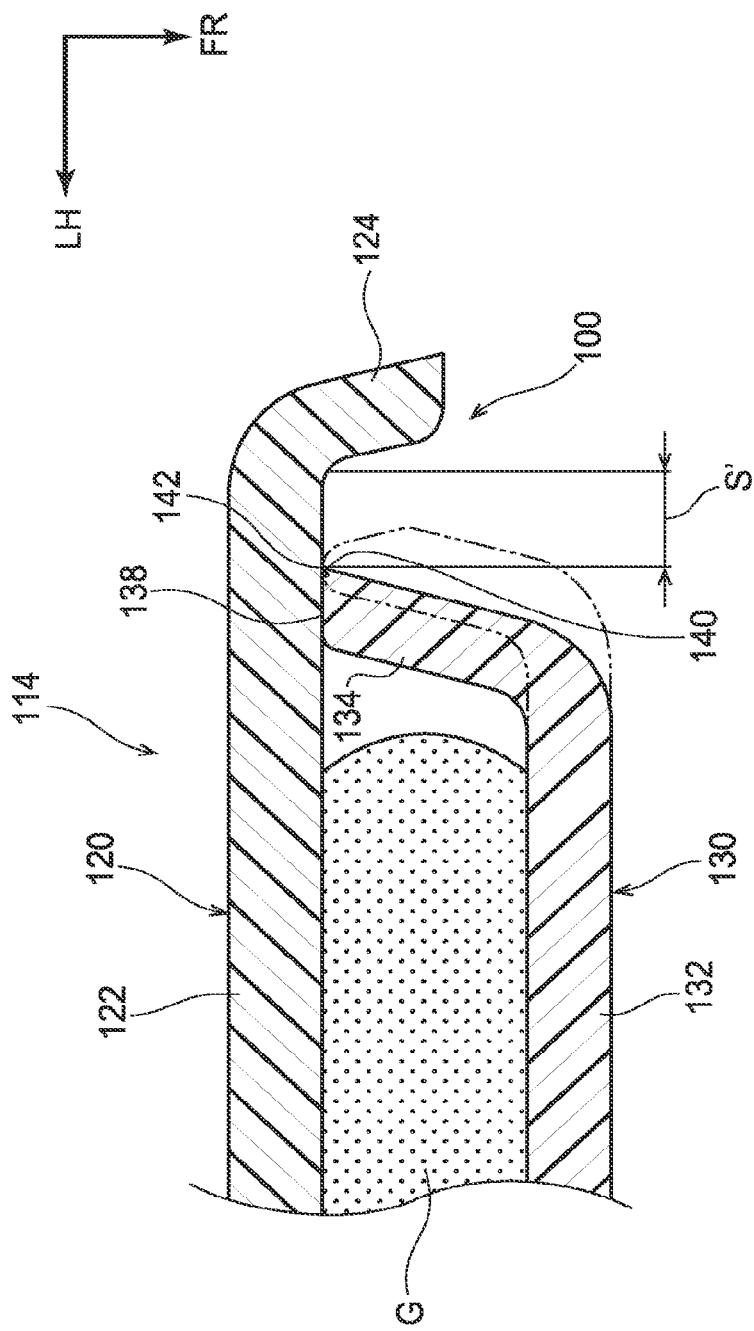
FIG. 4 is a cross-section view corresponding to FIG. 2, illustrating a vehicular resin panel structure according to a Comparative Example.

Explanation first follows regarding a vehicular resin panel structure 100 according to a Comparative Example. As illustrated in FIG. 4, in an inner panel 130 according to the Comparative Example, a parting line 140 is formed to a leading end portion 138 at an outer face of an inner edge portion 134 during molding. Burr 142 that projects out toward an outer panel main body 122 side of an outer panel 120 is thereby formed at the parting line 140.

The outer panel main body 122 is joined to an inner panel main body 132 using an adhesive G in a state in which the leading end portion 138 of the inner edge portion 134, including the burr 142, abuts an inner face of the outer panel main body 122. Thus, when the inner panel main body 132 slides relative to the outer panel main body 122 due to vibration or thermal expansion occurring in the vehicle while running or the like, the burr 142 scrapes against the outer panel main body 122, such that noise occurs.

In contrast thereto, in the inner panel 30 according to the present exemplary embodiment as illustrated in FIG. 2 and FIGS. 3A to 3C, the parting line 40 is formed during molding at a location separated from the leading end portion 38 on the outer face of the inner edge portion 34. There is accordingly no concern of the burr 42 scraping against the outer panel main body 22, even when the burr 42 occurs at the parting line 40. There is accordingly no concern of noise occurring due to scraping of the burr 42 in the inner panel 30 according to the present exemplary embodiment.

In the inner panel 30 according to the present exemplary embodiment, configuration is such that the inner sloped face 36 is formed by cutting away the outer face of the inner edge portion 34, including the burr 42, thereby enabling a configuration in which the burr 42 itself, which is the cause of the noise, is not present. Namely, the vehicular resin panel structure 10 according to the present exemplary embodiment enables noise due to scraping of the burr 42 to be effectively prevented or suppressed from occurring.

In the inner panel 130 according to the Comparative Example, the burr 142 is present at the leading end portion 138 of the inner edge portion 134, such that it is difficult to secure watertight performance in which water ingress between the outer panel main body 122 and the inner panel main body 132 is prevented. However, in the inner panel 30 according to the present exemplary embodiment, there is no burr 42 at the leading end portion 38 of the inner edge portion 34, thereby enabling watertight performance, in which water ingress between the outer panel main body 22 and the inner panel main body 32 is prevented, to be secured.

Note that, in the inner panel 130 according to the Comparative Example, the leading end portion 138 of the inner edge portion 134, including the burr 142, might conceivably be cut away; however, it would be difficult to secure the positioning accuracy of the leading end portion 138 in such cases. In contrast thereto, in the inner panel 30 according to the present exemplary embodiment as illustrated in FIG. 3B, the location of the outer face of the inner edge portion 34, including the burr 42, that is separated from the leading end portion 38 is cut away, thereby enabling the positioning accuracy of the leading end portion 38 to be secured.

As illustrated in FIG. 2, the inner sloped face 36 is parallel to the outer sloped face 26. This enables the space S formed between the outer sloped face 26 and the inner sloped face 36 to be suitably secured. Namely, this enables the space S, which absorbs variations in positioning accuracy when joining the outer panel main body 22 to the inner panel main body 32 (variations in component shape and attachment position), to be more effectively secured than in a configuration in which the outer sloped face 26 and the inner sloped face 36 are not parallel to each other.

In the outer panel 20 and the inner panel 30 according to the present exemplary embodiment, as described above, the specific space S is secured between the inner sloped face 36 formed to the inner edge portion 34 and the outer sloped face 26 formed to the outer edge portion 24. This enables the inner edge portion 34 to be disposed further toward the outside (the outer edge portion 24 side) than in a configuration in which a specific space S' (such as S'=2 mm) is secured between the outer face of the inner edge portion 134 and the inner face of an outer edge portion 124, as in the outer panel 120 and the inner panel 130 according to the Comparative Example (see FIG. 4).

This enables the closed cross-section profile configured by the outer panel main body 22 and the inner panel main body 32 to be made effectively larger than the closed cross-section profile configuring the outer panel main body 122 and the inner panel main body 132 according to the Comparative Example. This enables the strength and rigidity of the back door panel 14 to be improved compared to the strength and rigidity of a back door panel 114 according to the Comparative Example.

As illustrated in FIG. 2, the inner sloped face 36 with decreasing plate thickness on progression toward the leading end portion 38 is formed to the inner edge portion 34 of the inner panel 30 according to the present exemplary embodiment. This enables the contact surface area of the leading end portion 38 of the inner edge portion 34 that abuts the inner face of the outer panel main body 22 to be decreased, compared to a configuration in which the inner edge portion 34 is not formed with the inner sloped face 36 with decreasing plate thickness on progression toward the leading end portion 38.

A smaller contact surface area of the leading end portion 38 of the inner edge portion 34 with respect to the inner face of the outer panel main body 22 enables the accuracy of a joint position between the inner panel main body 32 and the outer panel main body 22 to be improved. In the inner panel 30 according to the present exemplary embodiment, the inner edge portion 34 is configured including the inner sloped face 36 with decreasing plate thickness on progression toward the leading end portion 38, thereby enabling the accuracy of the joint position between the inner panel main body 32 and the outer panel main body 22 to be improved.

The leading end portion 38 of the inner edge portion 34 is formed with a circular arc shaped cross-section. This enables the contact surface area of the leading end portion 38 of the inner edge portion 34 that abuts the inner face of the outer panel main body 22 to be further reduced compared to a configuration in which the leading end portion 38 of the inner edge portion 34 is not formed with a circular arc shaped cross-section. This enables the accuracy of the joint position between the inner panel main body 32 and the outer panel main body 22 to be further improved.

In the present exemplary embodiment, the outer panel 20 that configures the back door panel 14 together with the inner panel 30 is made of fiber reinforced plastic molded from a carbon fiber reinforced plastic (CFRP) material. This accordingly enables the weight of the back door panel 14 to be reduced while securing the strength and rigidity of the back door panel 14, compared to a configuration in which the outer panel 20 is not made of fiber reinforced plastic.

The vehicular resin panel structure 10 according to the present exemplary embodiment has been explained above based on the drawings; however, the vehicular resin panel structure 10 according to the present exemplary embodiment is not limited to that illustrated in the drawings, and design modifications may be applied as appropriate within a range not departing from the spirit of technology disclosed herein. The leading end portion 38 of the inner edge portion 34, for example, is not limited to a configuration formed with a circular arc shaped cross-section.

Moreover, the inner sloped face 36 may be formed with plate thickness that does not decrease on progression toward the leading end portion 38, as long as the configuration can secure the accuracy of the joint location between the inner panel main body 32 and the outer panel main body 22. Furthermore, the outer sloped face 26 and the inner sloped face 36 do not need to be disposed parallel to each other, as long as the configuration can suitably secure the space S that absorbs variation in positioning accuracy between the outer sloped face 26 and the inner sloped face 36.

The outer panel 20 and the inner panel 30 that configure the back door panel 14 are not limited to being made of carbon fiber reinforced plastic (CFRP), and may, for example, be made of glass fiber reinforced plastic (GFRP). The outer panel 20 may, for example, be made of a metal such as aluminum, rather than being made of fiber reinforced plastic.

The manufacturing method of the outer panel 20 and the inner panel 30 is not limited to the SMC press-molding method. The inner panel 30 according to the present exemplary embodiment may be manufactured using another molding method in which the burr 42 is liable to occur, or using another fiber reinforced plastic material (with high flowability) in which the burr 42 is liable to occur.

All publications, patent applications and technical standards mentioned in the present specification are incorporated by reference in the present specification to the same extent as if the individual publication, patent application, or technical standard was specifically and individually indicated to be incorporated by reference.

What is claimed is:

1. A vehicular resin panel structure comprising:
   an outer panel that includes an outer panel main body and an outer edge portion formed by bending an edge portion of the outer panel main body toward one side in a plate thickness direction of the outer panel main body; and
   a resin inner panel that includes an inner panel main body that is joined to the outer panel main body by an adhesive, and an inner edge portion that is formed by bending an edge portion of the inner panel main body toward another side in the plate thickness direction, a leading end portion of the inner edge portion abutting the outer panel main body, and a parting line during molding being formed at a location separated from the leading end portion, such that, in a case in which a burr occurs, the burr projects out toward an outer panel main body side from the parting line.

2. The vehicular resin panel structure of claim 1, wherein:
   a face of the outer edge portion that faces the inner edge portion includes an outer sloped face; and
   a face of the inner edge portion that faces the outer sloped face includes an inner sloped face with a plate thickness that decreases on progression toward the leading end portion.

3. The vehicular resin panel structure of claim 2, wherein the outer sloped face and the inner sloped face are disposed parallel to each other.

4. The vehicular resin panel structure of claim 1, wherein the leading end portion is formed with a circular arc shaped cross-section.

5. The vehicular resin panel structure of claim 1, wherein the outer panel is made of resin.

6. The vehicular resin panel structure of claim 1, wherein the parting line, which is formed during molding, is provided at a location separate from the leading end portion, the leading end portion having no parting line.

* * * * *